United States Patent [19]

Geissler

[11] Patent Number: 5,397,879
[45] Date of Patent: Mar. 14, 1995

[54] MICROWAVE CORN POPPER DEVICE AND METHOD

[75] Inventor: Richard L. Geissler, Chippewa Falls, Wis.

[73] Assignee: National Presto Industries, Inc., Eau Claire, Wis.

[21] Appl. No.: 153,639

[22] Filed: Nov. 17, 1993

[51] Int. Cl.⁶ .............................................. H05B 6/80
[52] U.S. Cl. ...................................... 219/727; 219/730; 219/728; 219/732; 219/759; 99/DIG. 14; 426/241
[58] Field of Search ............... 219/730, 727, 729, 728, 219/759, 734, 732; 99/DIG. 14, 451; 426/241, 243, 107

[56] References Cited

U.S. PATENT DOCUMENTS

| | | |
|---|---|---|
| D. 255,533 | 6/1980 | Lange et al. . |
| D. 255,535 | 6/1980 | Freedman et al. . |
| 2,179,468 | 11/1939 | Delf . |
| 2,194,852 | 3/1940 | Gundelfinger et al. . |
| 2,480,679 | 8/1949 | Spencer . |
| 2,522,085 | 9/1950 | Beckemeyer et al. . |
| 2,602,134 | 7/1952 | Nelson . |
| 2,901,587 | 8/1959 | Burreson . |
| 2,939,379 | 6/1960 | Schmitt . |
| 3,079,854 | 3/1963 | Shepherd . |
| 3,366,142 | 8/1967 | Lawson . |
| 3,699,874 | 10/1972 | Dusek . |
| 3,835,280 | 9/1974 | Gades et al. . |
| 3,847,067 | 11/1974 | Munsey . |
| 3,973,045 | 8/1976 | Brandberg et al. . |
| 3,974,354 | 8/1976 | Long . |
| 4,038,425 | 7/1977 | Brandberg et al. . |
| 4,039,797 | 8/1977 | Olsen . |
| 4,143,647 | 3/1979 | Husslein et al. . |
| 4,156,806 | 5/1979 | Teich et al. ............................ 219/730 |
| 4,158,760 | 6/1979 | Bowen et al. . |
| 4,166,208 | 8/1979 | Martel et al. . |
| 4,210,124 | 7/1980 | Husslein et al. . |
| 4,266,108 | 5/1981 | Anderson et al. . |
| 4,335,291 | 6/1982 | Ishino et al. . |
| 4,435,628 | 3/1984 | Bowen et al. . |
| 4,477,705 | 10/1984 | Danley et al. . |
| 4,496,816 | 1/1985 | McNamara . |
| 4,539,454 | 9/1985 | Yangas . |
| 4,563,561 | 1/1986 | Vaeth et al. ............................ 219/734 |
| 4,626,641 | 12/1986 | Brown . |
| 4,641,005 | 2/1987 | Seiferth . |
| 4,683,362 | 7/1987 | Yangas . |
| 4,724,290 | 2/1988 | Campbell . |
| 4,771,155 | 9/1988 | Yangas . |
| 4,823,683 | 4/1989 | Meisner . |
| 4,877,933 | 10/1989 | Yangas . |
| 4,878,765 | 11/1989 | Watkins et al. . |
| 4,902,520 | 2/1990 | Dysarz . |
| 4,906,806 | 3/1990 | Levinson . |
| 4,923,704 | 5/1990 | Levinson . |
| 4,940,867 | 7/1990 | Peleg ............................ 219/730 |
| 4,942,277 | 7/1990 | Narberes . |

(List continued on next page.)

FOREIGN PATENT DOCUMENTS

| | | | |
|---|---|---|---|
| 56-12928 | 2/1981 | Japan ............................ | 219/730 |
| 56-56534 | 5/1981 | Japan ............................ | 219/730 |
| 2-298728 | 12/1990 | Japan ............................ | 219/730 |

OTHER PUBLICATIONS

NordicWare literature page entitled "Microwave Hot Popper", model No. 66500, p. A1, Exhibit A.

(List continued on next page.)

*Primary Examiner*—Philip H. Leung
*Attorney, Agent, or Firm*—Merchant, Gould, Smith, Edell, Welter & Schmidt

[57] ABSTRACT

A microwave corn popper device is provided including a rigid bowl having a bottom portion and an inclined side extending upward from the bottom portion and terminating at a top portion. A microwave susceptor is separate from the bowl and disposed within the bowl adjacent the bottom portion to receive kernels of corn. The susceptor becomes hot in the presence of microwave energy. A saucer-shaped metal plate is disposed beneath the susceptor at a predetermined spaced apart distance. The metal plate is part of a support assembly which is separately mountable to the bowl.

34 Claims, 8 Drawing Sheets

U.S. PATENT DOCUMENTS

| | | | |
|---|---|---|---|
| 4,960,598 | 10/1990 | Swionter | 219/730 |
| 4,972,059 | 11/1990 | Wendt et al. | |
| 4,973,810 | 11/1990 | Brauner | |
| 5,008,024 | 4/1991 | Watkins | |
| 5,012,068 | 4/1991 | Anderson | |
| 5,045,660 | 9/1991 | Levinson | |
| 5,071,662 | 12/1991 | Dysarz | |
| 5,097,107 | 3/1992 | Watkins et al. | |
| 5,173,580 | 12/1992 | Levin et al. | 219/730 |
| 5,190,777 | 3/1993 | Anderson et al. | |
| 5,288,962 | 2/1994 | Lorence | 219/729 |

OTHER PUBLICATIONS

NordicWare literature page entitled "Microwave Specialty Items", pp. B1–B2, Exhibit B.

NordicWare literature page entitled "Microwave Cookware", p. C1, Exhibit C.

Photographs of a NordicWare Microwave and Conventional Ovens popper device, model 64104, pp. D1–D2, Exhibit D.

Photographs of an Anchor Hocking Microwave popcorn popper device, model 400/193/C, pp. E1–E2, Exhibit E.

Photographs of a Republic Molding Micro Ette microwave corn popper device, model 499, pp. F1–F2, Exhibit F.

Photographs of an Anchor Hocking, Anchor Ovenware Microwave Popcorn Popper Steamer/Roaster device, model Z6860, pp. G1–G3, Exhibit G.

Photographs of a Rubbermaid Microwave Cookware popcorn popper device, model 5517, pp.. H1–H3, Exhibit H.

Photograph of a Catamount Microwave Corn Popper device, p. I1, Exhibit I.

MICROWAVE CORN POPPER DEVICE AND METHOD

FIELD OF THE INVENTION

The present invention relates to devices and methods for popping corn in a microwave oven.

BACKGROUND OF THE INVENTION

Various techniques are known for popping kernels of corn to make popcorn. For example, it is known to supply heat to pop the corn kernels via open flame, a stove burner, or a popper appliance with an electrically powered heating element. Also, various popping techniques are known for making popcorn in a microwave oven. For example, U.S. Pat. No. 4,156,806 to Teich et al. discloses various concentrated energy microwave appliances for heating seeds, nuts, grains and the like such as popcorn kernels by means of microwave radiation.

Various concerns arise in the area of microwave heating of corn kernels to make popcorn. For example, some concerns arise in connection with the ease of manufacture and the costs to manufacture for the microwave corn popper device. Also, the ease of using and the costs of using the corn popper device are further concerns. In addition, there is a concern of achieving a quality result of popped corn, i.e., an acceptable number of unpopped kernels, and the taste and the appearance of the popped kernels, in a manner which is convenient for individuals to utilize.

There has been a long-felt need in the art for microwave corn popper devices and methods which address at least some of the above concerns and other concerns for making popcorn in a microwave oven.

SUMMARY OF THE INVENTION

The present invention relates to a microwave corn popper device including a bowl construction having a bottom portion and an inclined side extending upward from the bottom portion and terminating at a top portion. A microwave susceptor is disposed within the bowl construction adjacent the bottom portion to receive kernels of unpopped corn. The susceptor becomes hot in the presence of microwave energy. A metal plate is disposed beneath the susceptor at a predetermined spaced apart distance. The metal plate includes a portion disposed directly below the susceptor. The metal plate reflects microwave energy toward the susceptor and the kernels of unpopped corn. In a preferred embodiment an outer periphery of the plate defines an outer perimeter larger than the outer perimeter of the susceptor. Another preferred embodiment includes an inclined outer periphery defining a conical shape and a central planar portion.

The present invention also relates to a microwave corn popper device including a bowl having a bottom portion and an inclined side extending upward from the bottom portion and terminating at a top portion. A separate susceptor is positioned in the bowl adjacent the bottom portion. The susceptor becomes hot in the presence of microwave energy. In one preferred embodiment, the bottom portion includes a recess with a bottom surface and at least one support rib extending upward from the bottom surface. The support rib positions the susceptor away from the bottom surface. In one preferred embodiment, the susceptor includes at least one dead zone vertically above the support rib such that the susceptor does not heat as much or as fast in those areas.

The present invention further relates to a microwave corn popper device including a bowl having a bottom portion and an inclined side extending upward from the bottom portion and terminating in a top portion. A support assembly supports the bowl during microwave popping of the corn. A reflector plate with a central planar portion and an outer periphery disposed out of the plane of the central planar portion is provided with the support assembly to reflect microwave energy toward the interior of the bowl. The popper device preferably includes a separate bowl and support assembly and further preferably includes a twist-lock arrangement to releasably lock the support assembly to the bowl. In a further preferred embodiment, the support assembly is useable in two different orientations to position the reflector plate in one of two orientations relative to the bowl. In a preferred embodiment, a susceptor portion is provided with the bowl for generating heat in the presence of microwave energy. The susceptor portion is spaced from the reflector plate such that a vertical distance between the reflector plate and the susceptor portion positions unpopped kernels of corn at a distance approximately equal to the wavelength of microwave energy produced by the microwave oven.

The present invention further relates to a susceptor for a microwave corn popper device including a bowl having a bottom portion and an inclined side extending upward from the bottom portion, the bottom portion including an inner peripheral surface defining a recess. The susceptor includes a susceptor layer and a support layer affixed to the susceptor layer. The susceptor includes an outer peripheral edge sized for receipt by the inner peripheral surface such that the susceptor is positioned in the recess of the bowl.

The present invention also relates to a susceptor including a susceptor layer and a support layer affixed to the susceptor layer. The susceptor layer includes a metallized polymer layer, and the support layer includes paper. The support layer terminates at an outer peripheral edge generally coterminous with an outer peripheral edge of the susceptor layer. The susceptor layer and the support layer are both shaped to include a circular central portion defining a planar portion and an outer periphery positioned out of a plane of the planar portion. The outer periphery defines a circular outer perimeter portion. In a preferred embodiment, the susceptor includes a finger tab extending from the outer perimeter. In a further preferred embodiment, a dead zone is provided in the susceptor layer such that the dead zone does not heat as fast as the remaining portions of the susceptor layer.

The present invention also relates to a method of popping corn including the steps of providing a bowl, adding a separate susceptor to the bowl in an interior of the bowl, applying microwave energy to the corn and the susceptor to pop the corn. The method further preferably includes removing the corn from the bowl, and removing the separate susceptor. A preferred method also includes providing a reflector member with a planar portion and a second portion defining an outer perimeter which is disposed out of the plane of the planar portion. In a further preferred method, the reflector member is separable from the bowl. The reflector member is usable in a first position as a reflector for reflecting microwave energy to the kernels of corn disposed in the bowl. In a second position, the reflector member functions as a deflector for deflecting some microwave energy away from the kernels of corn. The method also further includes adding oil to the susceptor prior to popping the kernels of corn.

The present invention further relates to a method for popping corn including providing a bowl construction including a substantially rigid body defining a chamber for popping corn, the bowl construction including a susceptor region disposed in the chamber of the bowl construction, the bowl construction further including a metal plate disposed below the susceptor region. The method further comprises adding kernels to the bowl construction on the susceptor region, and supplying microwave energy to the bowl construction. The method further comprises heating the susceptor region with microwave energy, and reflecting additional microwave energy from the metal plate toward the susceptor region. The method further comprises removing the susceptor region from the bowl after popping of the corn kernels, and then adding a second susceptor region to the bowl and then popping additional corn with the bowl construction. A preferred method further includes removing the metal plate from the remainder of the bowl construction following use. The method further preferably includes adding oil to the bowl construction prior to popping the kernels of corn.

The present invention also relates to a method of assembling a microwave popper bowl device including the steps of providing a bowl with a bottom inside surface, and adding a separate susceptor to an interior of the bowl above the bottom inside surface.

These and other advantages and features of novelty which characterize the invention are pointed out with particularity annexed hereto, and forming a part hereof. However, for a better understanding of the invention, its advantages and objects obtained by its use, reference should be had to the drawings which form a further part hereof and to the accompanying descriptive matter in which there is illustrated and described preferred embodiments of the invention.

BRIEF DESCRIPTION OF THE DRAWINGS

In the drawings, like reference numerals generally indicate corresponding parts throughout the several views.

DETAILED DESCRIPTION OF THE PREFERRED EMBODIMENTS

The present invention relates to a microwave corn popper device and method wherein a rigid bowl construction is positioned in a microwave oven for use in popping kernels of corn to make popcorn. The invention generally includes a rigid bowl, a bowl support assembly including a plate of metal or other microwave reflective construction, and a susceptor heatable by microwave energy and positioned within an interior of the bowl. A lid closes an open top of the bowl. The kernels of corn are heated from: (1) microwave energy directed upon the kernels of corn from the microwave energy source directly and/or from reflections from the interior structures of the microwave oven; (2) microwave energy reflected from the metal plate toward the susceptor and/or kernels of corn; and/or (3) heat supplied by the susceptor as the susceptor heats up in the presence of the microwave energy. The present invention results in a convenient and reusable device wherein the susceptor is replaceable as desired after one or more uses.

Figure 1:
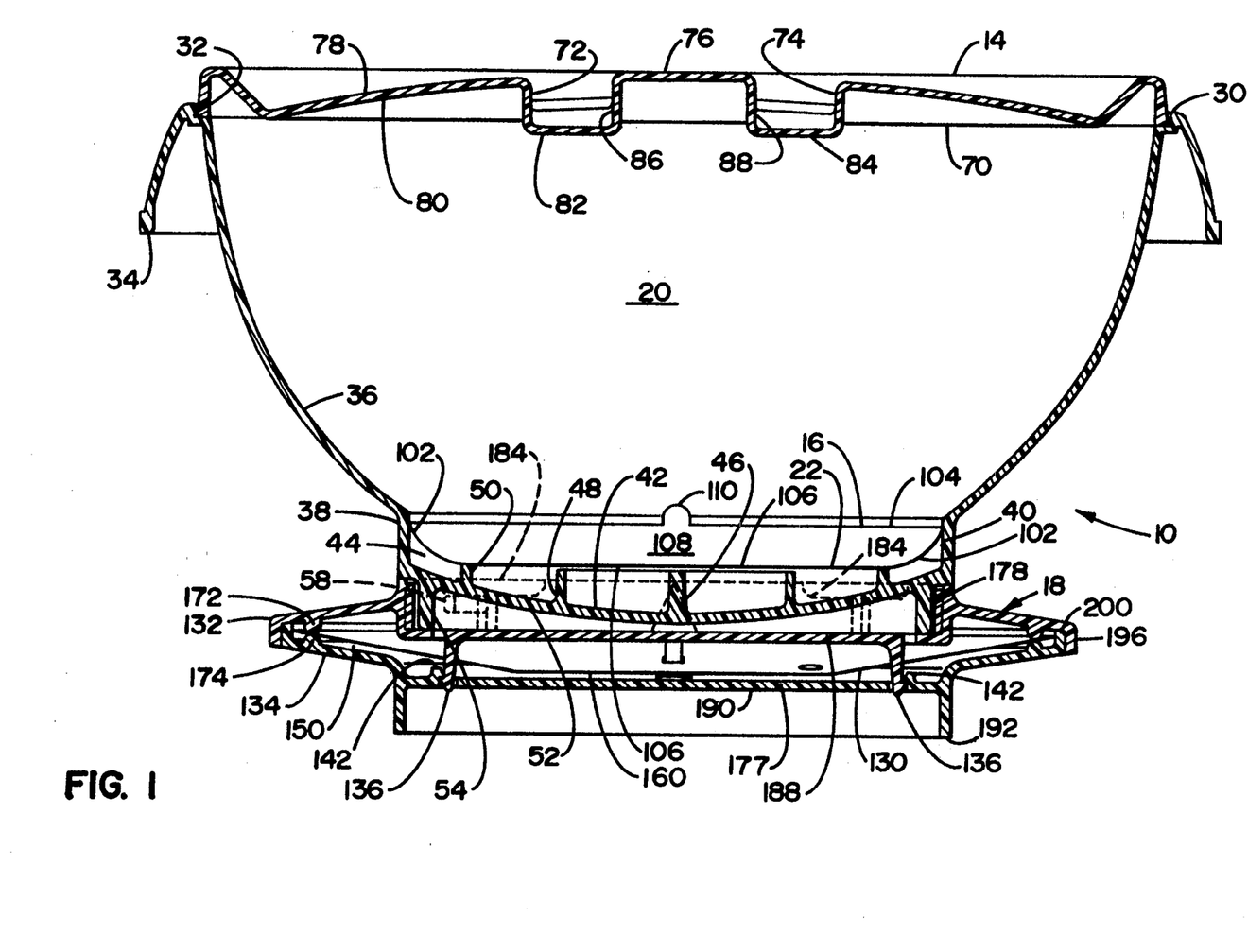
FIG. 1 is a cross-sectional view of one embodiment of a microwave corn popper device according to the present invention.
Figure 2:
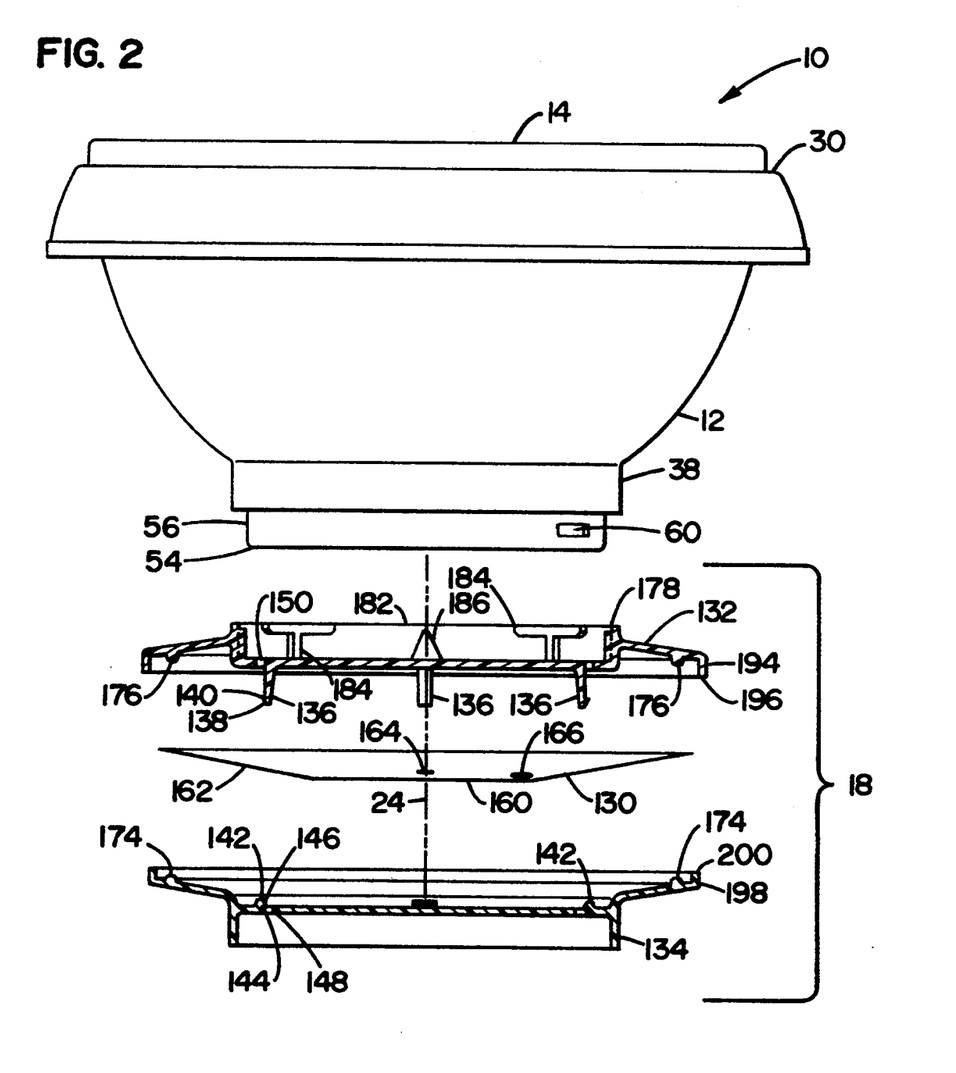
FIG. 2 is an exploded view on a smaller scale of the microwave corn popper device of FIG. 1 in partial cross section.

Referring now to FIGS. 1 through 8, a preferred embodiment of a microwave corn popper device 10 (hereinafter referred to as popper 10) is shown. Referring in particular to FIGS. 1 and 2, popper 10 includes a bowl 12, a movable lid 14, a susceptor 16, and a support assembly 18. As used herein, "susceptor" includes laminated structures including a metallized layer and other constructions which generate heat in the presence of microwave energy. Preferably, susceptor 16 is separate from bowl 12, although integral constructions are possible. Preferably, support assembly 18 interfits with or otherwise engages bowl 12 to hold bowl 12 at a spaced apart distance from a horizontal surface. More preferably, temporary attachment structure is provided to permit selective attachment of bowl 12 to support assembly 18 during use. Support assembly 18 can be permanently mounted to bowl 12, or can include at least a portion integrally formed therewith.

Bowl 12 is a substantially rigid structure of a microwave transparent material which cooperates with lid 14, also of a microwave transparent material, to define an enclosed chamber 20 for receiving unpopped kernels of corn, and then the popped kernels as the kernels are popped during use. The kernels of corn are positioned on top 22 of susceptor 16 during the popping operation. A portion of support assembly 18 is transparent to microwave energy, and another portion is not. Device 10 is placed in a microwave oven and microwave energy contacts the corn, support assembly 18, and susceptor 16. Once most or all of the kernels of corn are popped, popper 10 is removed from the microwave oven. Lid 14 is removable for access to chamber 20 to serve the popped corn.

Figure 3:
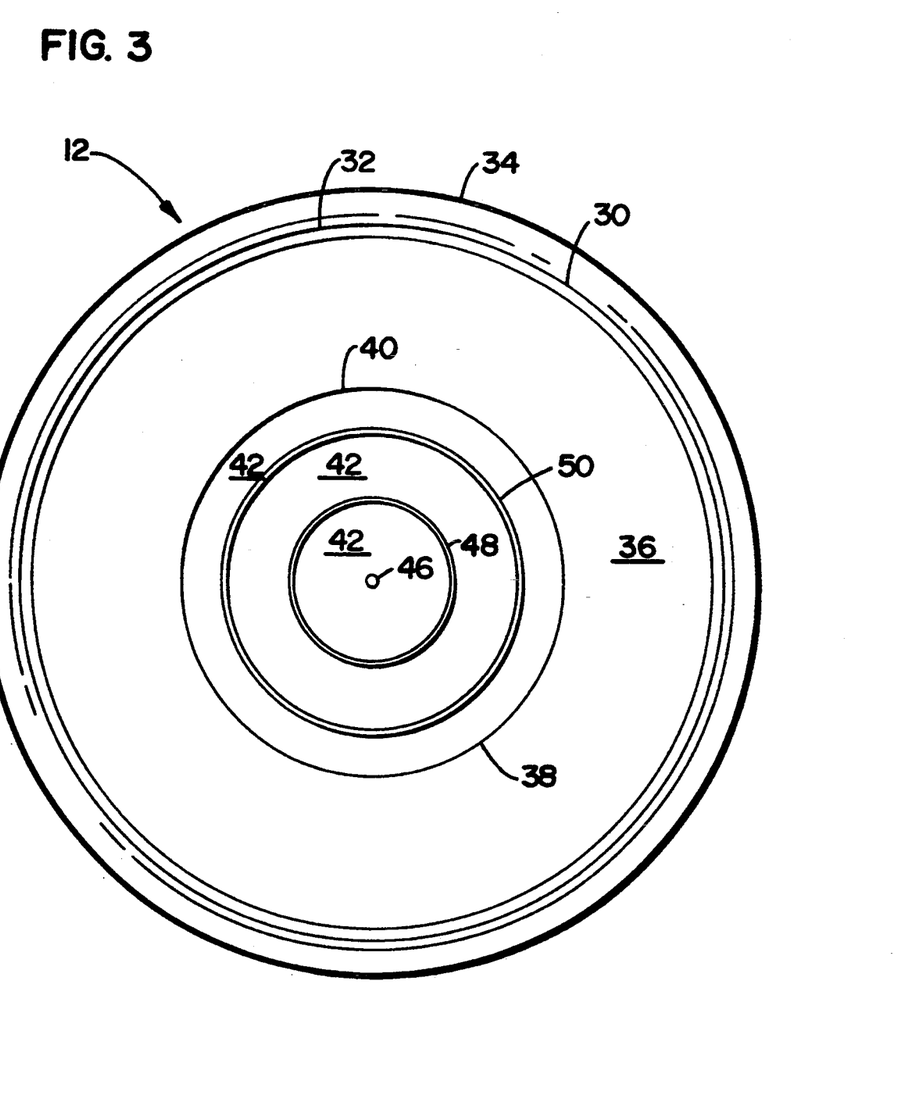
FIG. 3 is a top view of the bowl in the same general scale as FIG. 2.

Referring now to FIGS. 1–3, bowl 12 is shown to include a rim 30 with a recess 32 for receiving lid 14. Lid 14 rests in recess 32 and is retained with bowl 12 in this manner. An outer lip or skirt 34 of bowl 12 functions as a convenient handle for holding bowl 12. Bowl 12 further includes an inclined side 36 extending from a base portion 38 to recess 32. Inclined side 36 is configured as a radius. Other shapes are possible. During popping, any kernels disturbed from susceptor 16 and moved upwardly away from susceptor 16 may be directed back toward susceptor 16 by inclined side 36 under the effects of gravity.

Base portion 38 of bowl 12 includes a vertical side 40 and a bottom inside surface 42 which cooperate to define a recess 44. Vertical side 40 defines an inner peripheral surface of recess 44. Extending upward from bottom inside surface 42 are a plurality of support members or ribs including a central support post 46, a first, inner support ring 48, and a second, outer support ring 50. Rings 48, 50 are cylindrical in configuration about the axis 24 of popper 10. Vertical side 40, and the various support ribs 46, 48, 50 support and retain susceptor 16 in recess 44 during use. In addition, support ribs 46, 48, 50 position susceptor 16 at a spaced apart distance from bottom inside surface 42.

Bowl 12 includes a bottom outside surface 52 facing in an opposite direction to bottom inside surface 42. Extending from bottom outside surface is a generally cylindrical leg 54 which can support bowl 12 on a generally horizontal surface. Leg 54 includes an outer peripheral surface 56 having a generally cylindrical configuration. Extending from peripheral surface 56 are two projections or bayonets 58, 60. Bayonets 58, 60 are positioned on opposite sides of peripheral surface 56 of bowl 12. Bayonets 58, 60 are useful in temporarily locking bowl 12 to support assembly 18, as will be discussed below.

Lid 14 defines a generally circular shape about the axis 24 of popper 10. Lid 14 includes an outer peripheral edge 70, which is received by recess 32 of bowl 12. Lid 14 is generally configured of microwave transparent material and provides a sufficiently strong configuration to support itself during use when edge 70 is positioned in recess 32. A top surface 78 of lid 14 further includes two parallel linear channels 72, 74 formed therein to define a handle 76. The fingers of the user's hand fit conveniently in channels 72, 74 for grasping of handle 76 to lift lid 14 away from bowl 12. For example, the user's thumb fits into channel 72 and the index finger into channel 74 to grasp handle 76. Inside surface 80 of lid 14 keeps popped corn from leaving bowl 12 during popping.

Lid 14 is configured to not provide an excessively large profile. In particular, handle 76 is formed via the two channels 72, 74 formed as recesses in top surface 78 of lid 14. Similarly, channels 72, 74 form protrusions extending from bottom surface 80 of lid 14. Moreover, bottom portions 82, 84 of respective channels 72, 74 extend vertically below edge 70 to provide conveniently sized gripping surfaces 86, 88 on handle 76, and yet leave sufficient room inside bowl 12 for the popped corn, without raising the height of popper 10 too much.

Referring now to FIGS. 1, 2, 4, and 5, susceptor 16 is shown to include a base 100 defining a generally planar central portion, and an outer periphery 102 defining the outer perimeter of susceptor 16 and further being positioned out of the plane of the base 100. Outer periphery 102 includes a radiussed interface with base 100 and cooperates with base 100 to define a generally cup-shaped or saucer-shaped susceptor 16 having an upwardly concave shape for holding kernels of corn. Other shapes for susceptor 16 are possible including other curves, frustoconical (truncated cone), or flat.

A top edge 104 of susceptor 16 is positioned adjacent vertical side 40 of bowl 12. Top edge 104 defines an arcuate shape defined by a radius. A bottom surface 106 engages support ring 50 as shown in FIG. 1. In the preferred embodiment, susceptor 16 is spaced apart from support post 46 and inner support ring 48 a small amount, such as on the order of about 0.040 inches, prior to initial use of susceptor 16, such as to prolong the life of the bowl components by positioning support post 46 and first support ring 48 slightly away from direct contact with susceptor 16 and direct heat given off by susceptor 16. Support post 46 and first support ring 48 would further engage bottom surface 106 of susceptor 16 once base portion 100 was disposed out of the plane, such as may occur under the weight of the kernels of corn positioned in kernel chamber 108, and/or after use of susceptor 16. As shown in FIGS. 1 and 2, support members 46, 48, 50 keep bottom surface 106 of susceptor 16 away from bottom surface 42 of bowl 12. In this manner, susceptor 16 is self regulating. If the temperature generated at susceptor 16 is too great, susceptor 16 deteriorates, thereby protecting bowl 12.

Extending from top edge 104 of outer periphery 102 of susceptor 16 is a finger tab 110 for convenient grasping by the hand of the user. Such finger tab 110 is useful for initial placement, and subsequent removal of susceptor 16 in bowl 12.

Figure 5:
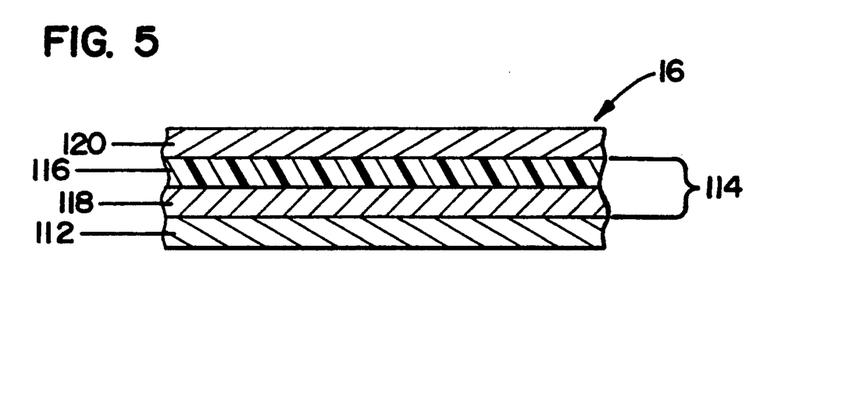
FIG. 5 is an enlarged scale schematic cross-sectional view of a portion of the susceptor shown in FIG. 4.

Susceptor 16 is provided with structure which heats up in the presence of microwave energy, such as a susceptor layer 114. One preferred susceptor 16 includes a cardboard or other paper or other microwave transparent support layer 112 as shown in FIG. 5. Affixed to support layer 112 is a metal layer 118 which is affixed to a polymeric support layer 116, such as polyester. Metal layer 118 is a thin layer of particles of metal which generates heat in the presence of microwave energy.

Other susceptor layers 114 which heat in the presence of microwave energy are possible besides the metallized polyester susceptor layer 114 shown in the Figures. Support layer 112 is generally coterminous with susceptor layer 114.

In the preferred embodiment, an upper protective layer 120 may be provided to protect susceptor layer 114. Upper protective layer 120 may optionally include an oil-resistant paper to protect the susceptor layer 114 from cooking oil which may optionally be added by the user to facilitate popping of the corn and/or enhancement of corn taste. Layers 112, 114, and 120 are joined by adhesive or other attachment structure to form a single unitary susceptor 16.

Figure 4:
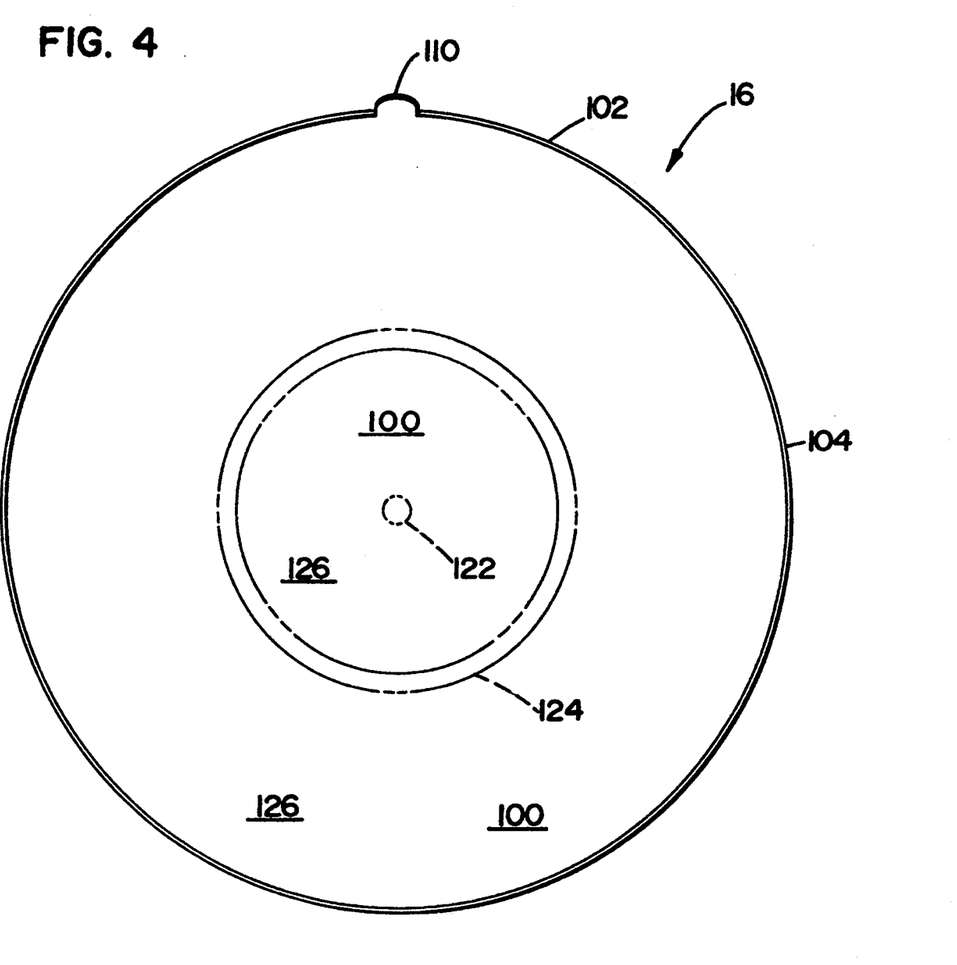
FIG. 4 is a top view of the susceptor of FIGS. 1 and 2 in an enlarged scale.

Referring now to FIG. 4, susceptor 16 is provided with two dead zones 122, 124 for protecting components of bowl 12 as susceptor 16 heats in the presence of microwave energy. In particular, central circular dead zone 122 and ring dead zone 124 are provided with removed susceptor regions (removed metal in the preferred embodiment) of the susceptor layer 114. With removed susceptor regions in these areas, these portions of the susceptor will not heat as fast or as much as the remaining portions 126. The dead zones 122, 124 correspond with locations adjacent (vertically above in the Figures) support post 46 and first support ring 48 during use. The dead zones 122, 124 assist in preventing or limiting support post 46 and first support ring 48 from damage over time due to the heating effects of susceptor 16. A dead zone adjacent ring 50 may be provided, if desired.

Referring now to FIGS. 1, 2, and 6–8, support assembly 18 includes a plate 130 disposed between an upper member 132 and a lower member 134. Upper member 132 and lower member 134 cooperate to enclose plate 130 as shown in FIG. 1 with a microwave transparent material. Upper member 132 is snap fittingly joined to lower member 134 via a snap arrangement including projections 136 extending downwardly from upper member 132. Each projection includes an inclined surface 138 and a tab surface 140. Extending upward from lower member 134 are second projections 142. Each of second projections 142 includes an inclined surface 146 and a tab surface 144. Each tab surface 144 of second projections 142 engages a tab surface 140 of projections 136 to attach upper member 132 to lower member 134. Inclined surfaces 138, 146, and the flexible construction of projections 136 facilitate a snap fit when upper member 132 is positioned adjacent lower member 134 and pressed together along the axial direction of popper 10 during assembly. Projections 136 are each received in a hole 148 of lower member 134. Holes 148 are useful as a coring location to form tab surface 144 during manufacturing of lower member 134 out of molded plastic as a coring location to form tab surface 144. Holes 150 of upper member 132 are useful in coring during manufacturing to form tab surface 140 of each projection 136.

Figure 7:
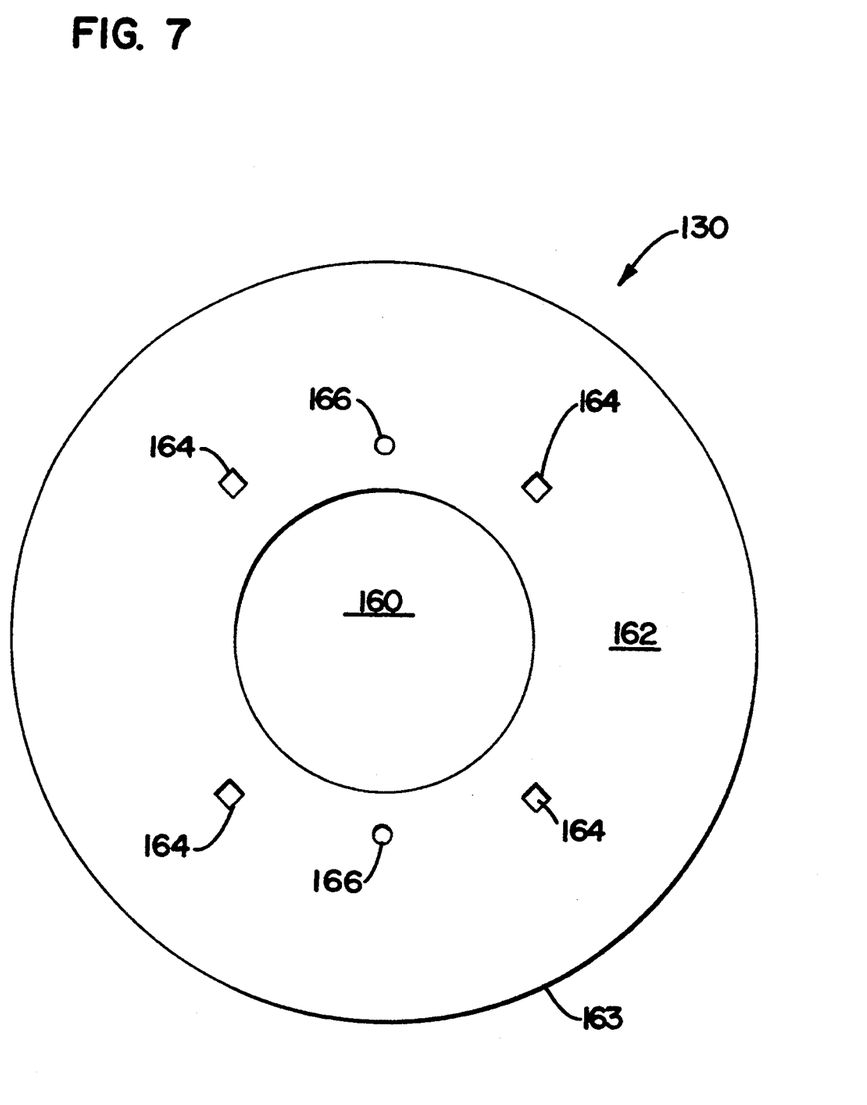
FIG. 7 is a top view of the metal plate of the support assembly in a smaller scale than FIG. 1.

Referring now to FIGS. 1 and 7, plate 130 includes a planar base portion 160 surrounded by an outer periphery 162 disposed out of the plane of planar base portion 160. Outer periphery 162 is shown in the preferred embodiment as being conically shaped. Other shapes are possible including curved for outer periphery 162. Plate 130 defines a general saucer shape. Plate 130 is provided with four generally square small holes 164 for receipt of projections 136 as shown in FIG. 1. An outer edge 163 of plate 130 defines a circular shape.

Figure 6:
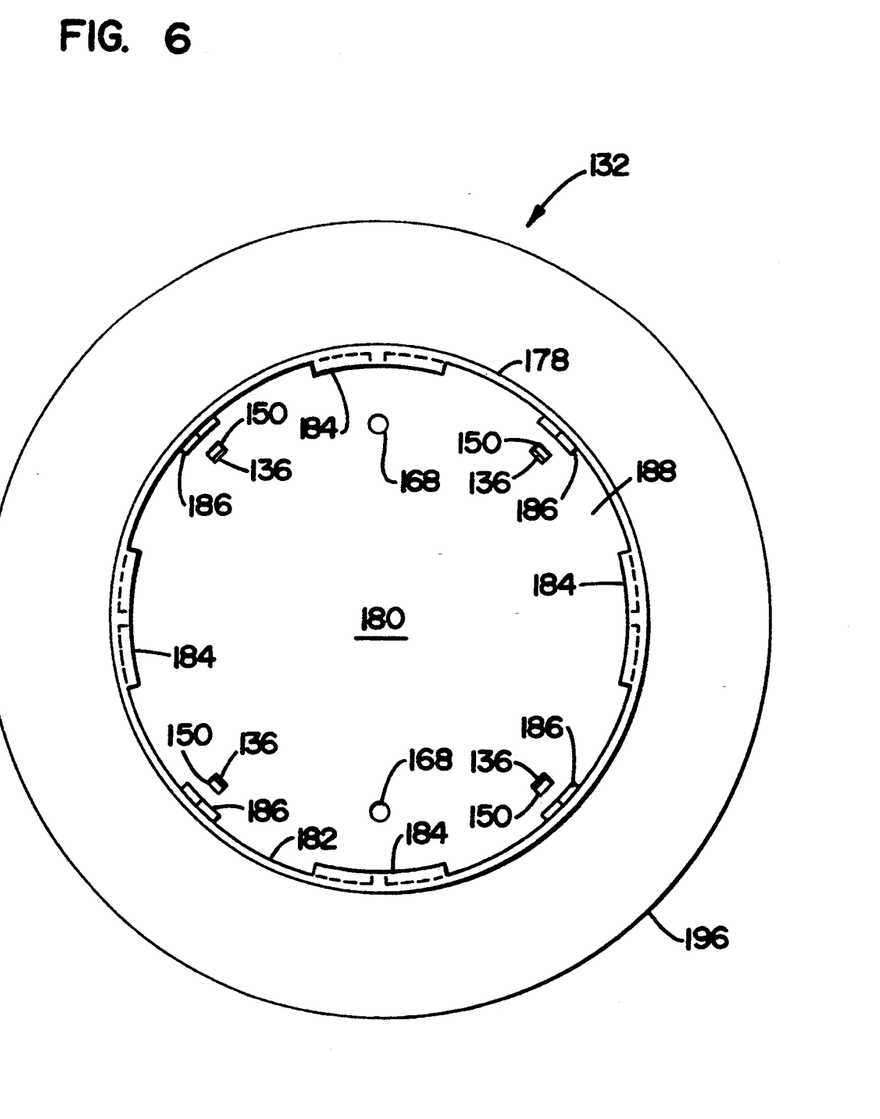
FIG. 6 is a top view of the upper member of the support assembly in a smaller scale than FIG. 1.
Figure 8:
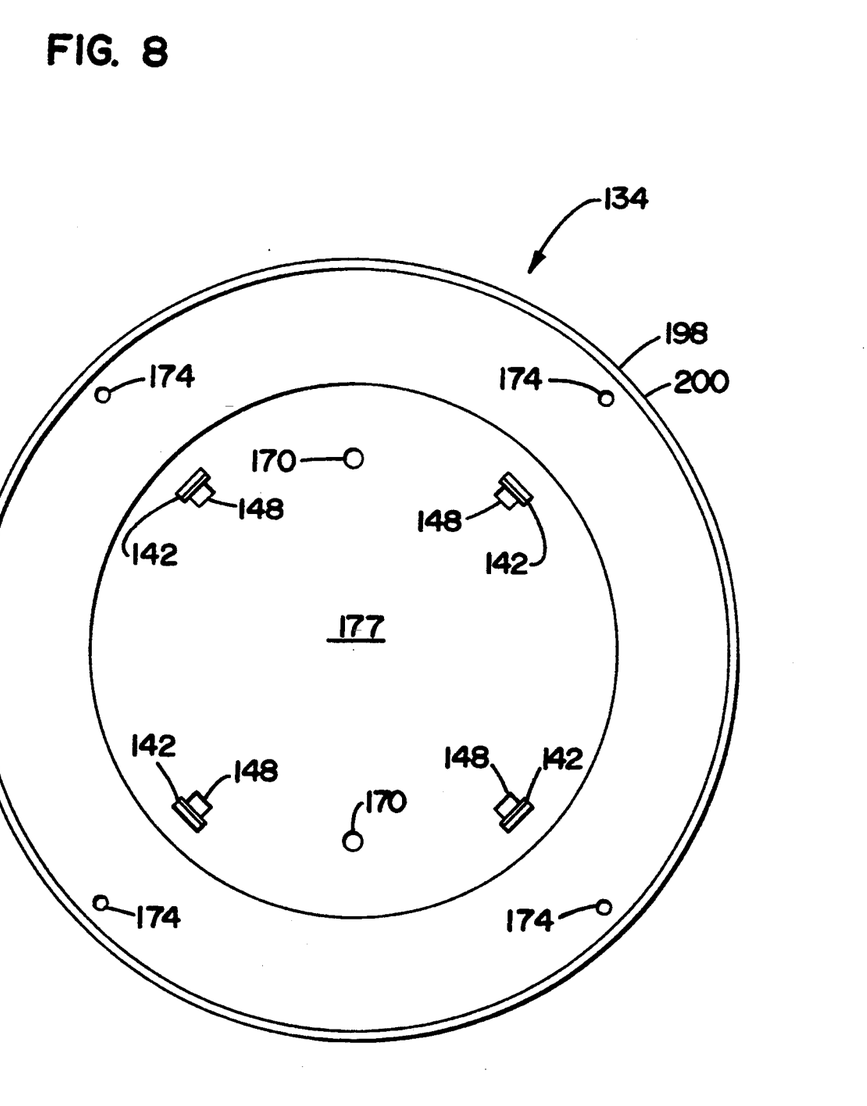
FIG. 8 is a top view of the lower member of the support assembly in a smaller scale than FIG. 1.

Two generally round small holes 166 through plate 130 are provided to facilitate alignment of plate 130 with upper member 132 and lower member 134 during assembly. Referring now to FIGS. 6 and 8, upper member 132 is provided with two small alignment holes 168, and lower member 134 is provided with two small alignment holes 170. During manufacturing, two rod members (not shown) are provided and positioned in holes 166 of reflector plate 130, holes 168 of upper member 132, and holes 170 of lower member 134 to facilitate proper alignment. Once aligned, projections 136 can easily pass through square holes 164 of plate 130 to snap fittingly engage projections 142 of lower base member 134 as shown in FIG. 1.

Once assembled, four bumps 172, equally spaced, project from upper base member 132 toward plate 130. Similarly, four bumps 174, equally spaced, project from lower member 134 toward bumps 172 of upper member 132. As shown in FIG. 1, bumps 172, 174 cooperate to trap and hold plate 130. As shown in FIG. 1, plate 130 is suspended via bumps 172, 174 in a chamber 150 between upper member 132 and lower member 134 such that planar base portion 160 is positioned at a spaced apart distance away from upper planar portion 177 of lower member 134. Bumps 172, 174 cooperate such that plate 130 is not bent during snap assembly of upper member 132 to lower member 134.

As shown in FIGS. 1, 2 and 6, upper member 132 includes an upper edge 178 which engages outside bottom surface 52 of bowl 12. A recessed region 180 of upper member 132 includes an inner peripheral surface 182 defining a generally cylindrical shape. Extending generally radially inwardly from an inner surface 182 are four T-lock members 184 and four stops 186. Two T-lock members 184 receive bayonets 58, 60 of bowl 12 to mount bowl 12 to upper member 132, as shown in FIG. 1 (only bayonet 58 is shown in FIG. 1). In this manner, a twist-lock arrangement is provided for selectively mounting bowl 12 to support assembly 18. Stops 186 limit rotational movement of bowl 12 relative to support assembly 18 during the unlocking operation. Stops 186 prevent the user from inadvertently twisting bayonets 58, 60 from one locked position to another. Stops 186 further include a wedge shape to cause bowl 12 to rotate relative to support assembly 18 when bowl 12 is dropped downwardly into recessed region 180. Once bowl 12 is positioned in recessed region 180 and locked relative to support assembly 18, leg 54 supports bowl 12 on upper planar portion 177 of upper member 132. Lower member 134 includes a recessed region 190 including a projecting ring 192 for use in supporting popper 10 on a horizontal surface, such as the oven surface, or a countertop.

Upper member 132 includes an outer edge 194 with a downwardly projecting circular lip 196. Lower member 134 includes an outer edge 198 and an upwardly projecting circular lip 200. As shown in FIG. 1, lip 200 fits within the inner perimeter defined by lip 196 of upper member 132 in the assembled state.

In operation of popper 10, lid 14 of popper 10 is removed or otherwise positioned away from bowl 12. Preferably, although not required, prior to positioning susceptor 16 within bowl 12, support assembly 18 is mounted to bowl 12 with a twist motion to position bayonets 58, 60 adjacent two of T-lock members 184. Susceptor 16 is positioned in the bottom of bowl 12 within recess 44. Kernels of unpopped corn are placed on susceptor 16 in kernel chamber 108. Lid 14 is positioned over the open end of bowl 12. Popper 10 is then placed in a microwave oven and exposed to microwave energy. Microwave energy will pass through lid 14, bowl 12, and upper member 132 and lower member 134 of support assembly 18 to contact the kernels of corn. Plate 130 will reflect microwave energy toward the kernels and toward susceptor 16 to further heat the kernels. Microwave energy contacting susceptor 16 will cause susceptor 16 to heat up. The heating up of susceptor 16 will cause further heating of the kernels. The operation of popping corn in popper 10 is complete when most or all of the kernels are popped. Inclined side 36 returns to susceptor 16 kernels displaced from susceptor 16 during popping.

After popping, lid 14 is removed and the popped corn can be removed from the bowl 12. Bowl 12 also functions as a convenient serving dish for serving the popped corn directly to the user. If desired, support assembly 18 can be removed from bowl 12 by twisting in the reverse direction to the direction in which the two members were rotated to attach. In this manner, bowl 12 can be conveniently carried to another location leaving support assembly 18 behind. Also, bowl 12 can be cleaned separate from support assembly 18. In addition, popper 10 can be conveniently stored with support assembly 18 positioned inside bowl 12 in chamber 20, with lid 14 positioned to close bowl 12.

It is preferred that the kernels of corn not extend over top edge 104 of susceptor 16 when popper 10 is first placed in the oven. It has been found that a single layer and/or a generally double layer of kernels works well on susceptor 16.

The optimum spacing of susceptor 16 from plate 130 is preferably such that kernels of corn resting on susceptor 16 are spaced at a distance about equal to the wavelength of microwave energy produced by the oven. Preferably, such distance is about 1.21 inches, the wavelength of microwaves produced by conventional microwave ovens. The distance between susceptor 16 and plate 130 in the vertical direction is slightly less to support the kernels at the proper distance, about 1.0 inches.

Plate 130 functions much like a floor of the microwave oven which reflects microwaves impinging on the floor. However, a benefit to providing plate 130 in popper 10 is that plate 130 is consistently at a predetermined distance from susceptor 16 to optimize corn popping performance. If reliance was made entirely upon the floor of the microwave oven to reflect microwaves back toward susceptor 16, inconsistent results may be achieved since the true reflective floor of the microwave may vary due to intervening structures such as due to a glass tray or a wire rack in the oven which would position popper 10, and susceptor 16, at varying differences from the reflective floor for different ovens.

Following use, susceptor 16 can be discarded. Alternatively, susceptor 16 can be reused any number of times until the susceptor has discolored or deteriorated to the point where the user desires a new susceptor 16. Since susceptor 16 is not permanently mounted to bowl 12, removal and replacement of susceptor 16 is handled in a convenient manner.

If desired, cooking oil or fat can be added to the kernels of corn prior to popping to facilitate better popping and/or more flavorful popping due to the presence of the oil, if desired.

The following is an example of one preferred construction of popper 10. Bowl 12, lid 14, upper member 132 and lower member 134 are made from material transparent to microwave energy, including polymeric materials. Polymethylpentene is an example of one anticipated material which can be molded to form bowl 12, lid 14, upper member 132 and lower member 134. Typical wall thicknesses are about 0.060 inches for bowl 12 and lid 14. Typical wall thicknesses for upper member 132 and lower member 134 are about 0.080 inches. Plate 130 is preferably constructed from about 0.010 inches thick 3003-14 aluminum. Planar base portion 160 of plate 130 generally extends for a diameter of about 2.750 inches and inclined outer periphery 162 defines an outside circular perimeter having a diameter of about 6.817 inches. Inclined outer periphery 162 is positioned at an angle of approximately 10° from the horizontal plane. Susceptor 16 is preferably a triple laminated construction including a support layer 112 of about 0.014 inch thick SBS board, a middle layer of metallized polyester film 114, and a top layer 120 of lamopaque oil-resistant paper. Susceptor 16 has a top edge which defines an outer circular perimeter having a diameter of about 4.76 inches diameter with a 0.50 inch radius at the interface of base 100 and outer periphery 102. Outer periphery 102 generally extends at a 30° angle from the vertical axis. About ⅓ cup of kernels fits conveniently into kernel chamber 108 such that the kernels are in a generally double layer thickness and none or a very few have a portion of the kernel extending above top edge 104 of susceptor 16.

Susceptor 16 can be used once and then discarded. Alternatively, susceptor 16 of the above-construction can be reused, such as on the order of 4 to 5 times, until it becomes discolored or so structurally deteriorated that reuse is no longer desired. Bowl 12, lid 14, and support assembly 18 are reusable indefinitely. An owner of bowl 12, lid 14, and support assembly 18 need only a supply of replacement susceptors 16 to continue reusing popper 10.

In some situations, it may be desirable to invert the orientation of support assembly 18. In a reversed orientation, plate 130 would include inclined outer periphery 162 extending generally downwardly vertically relative to its orientation shown in FIG. 1. Leg 54 fits into recessed region 190 of lower member 134 in the inverted position. Such positioning may be desirable in some microwave ovens wherein some microwave energy is deflected away from bowl 12 by inclined outer periphery 162 having the downward positioning during cooking. This can avoid hot spots in some microwave ovens which would have a tendency to burn the corn prior to the complete popping of the remainder. Some microwave energy is still reflected from plate 130 toward susceptor 16 such as by central portion 160 as in the orientation shown in the Figures. If desired, a similar mounting arrangement can be provided adjacent recessed region 190 for temporarily mounting bowl 12 to lower member 134.

It is to be appreciated that popper 10 is useable as a bowl for popping corn with just the presence of susceptor 16 and without the presence of plate 130. Also, popper 10 is useable for popping corn with just the presence of plate 130 and without the presence of susceptor 16. Although, the preferred popper 10 includes both susceptor 16 and plate 130.

Figure 9:
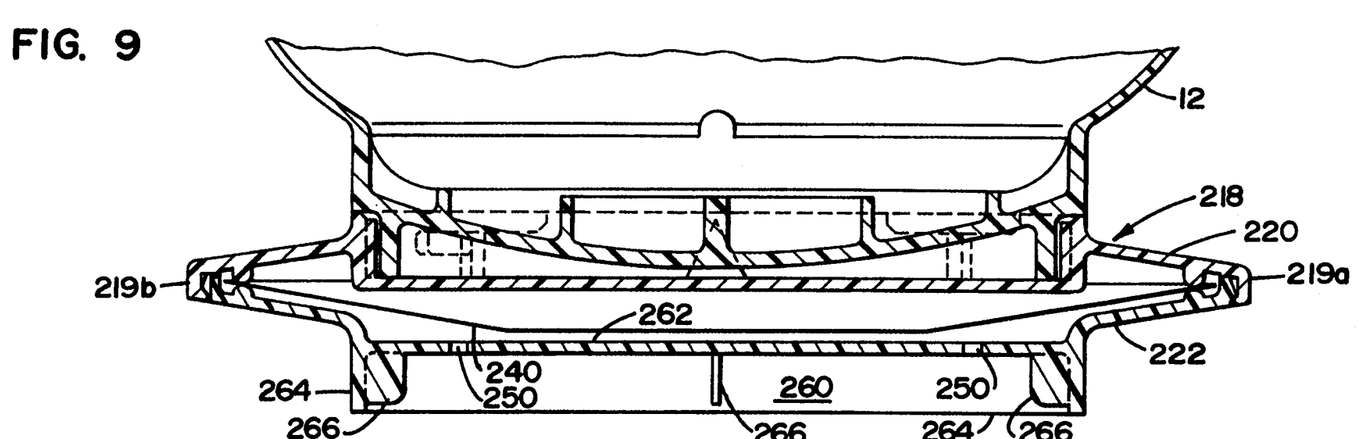
FIG. 9 is a cross-sectional view of a portion of an alternative embodiment of a microwave corn popper device.
Figure 10:
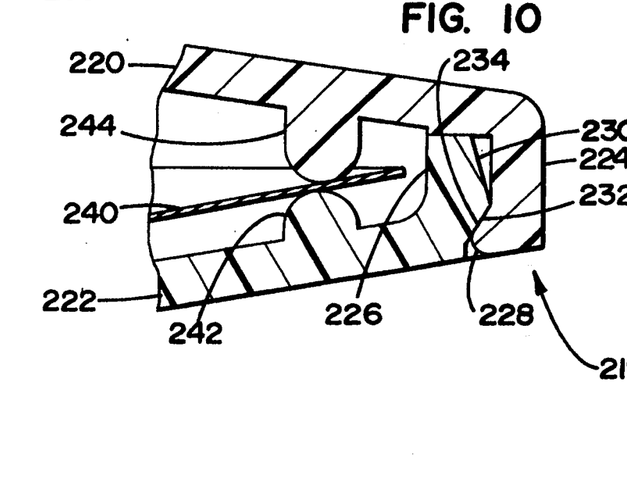
FIG. 10 is an enlarged detail view of a first portion of the support assembly of the alternative embodiment.
Figure 11:
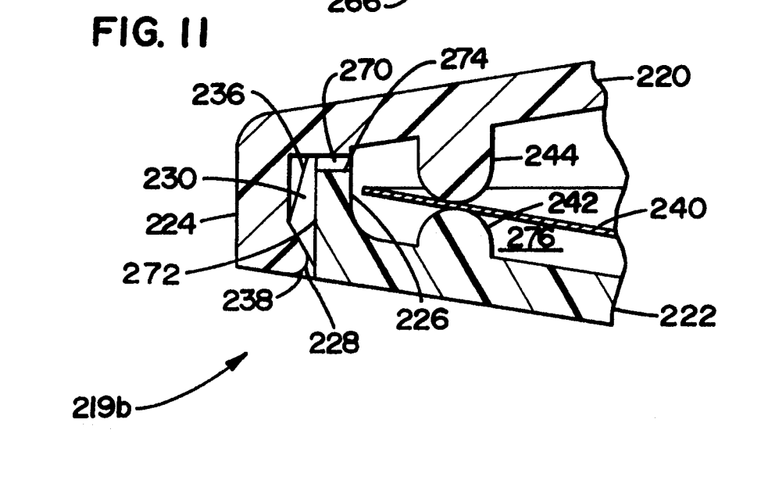
FIG. 11 is an enlarged detail view of a second portion of the support assembly of the alternative embodiment.

Referring now to FIGS. 9–11, an alternative embodiment of a support assembly 218 is shown. Support assembly 218 interfits to bowl 12 in the same manner as support assembly 18. FIG. 10 is an enlarged view of side 219a of support assembly 218 of FIG. 9. FIG. 11 is an enlarged view of side 219b of support assembly 218 of FIG. 9. An upper member 220 snap fits to a lower member 222 along lips 224, 226. A ridge 228 extends inwardly from an outer lip 224 to engage a projection 230 extending outwardly from an inner lip 226. Ridge 228 extends completely around lip 224. Projection 230 extends completely around lip 226 except at passages 270, as will be described below. Sloped surfaces 232, 234 engage one another to hold upper member 220 to lower member 222. A ramp surface 236 and a curved end 238 of ridge 228 facilitate an easy snap fit during assembly.

Once upper member 220 is snap fit to lower member 222, a plate 240 is suspended by bumps 242, 244 as in the support assembly 18. Plate 240 has a same overall shape and material construction to plate 130. However, plate 240 is preferably a continuous structure since it does not require any apertures for projections 136, 142 or for assembly alignment rods, as was provided for in plate 130.

In FIG. 9, four equally spaced holes 250 are provided in a planar portion 262 of lower member 222 about a circular pattern. Only two holes 250 are visible in FIG. 9.

As shown in FIG. 9, lower member 222 includes a recess 260 bounded by planar portion 262 and cylindrical leg 264. Extending radially inwardly from leg 264 are four equally spaced tabs 266. Only three tabs 266 are visible in FIG. 9. Tabs 266 are provided to prevent a user from orienting support assembly 218 180 degrees relative to the vertical such that lower member 222 would be above upper member 220. Tabs 266 are optional since in some uses inversion of support assembly 218 is desired, such as to invert the orientation of plate 240.

Referring now to FIG. 11, a drainage passage 270 is shown for accessing an interior of support assembly 218 to drain water or other matter. First notch 272 and second notch 274 form a generally L-shaped passage 270 to an interior 276 of support assembly 218. A plurality of other passages 270 are interspersed around the perimeter of support assembly 218. Notches 272, 274 are about 0.03 inches wide and each pair of notches 272, 274 is equally spaced around the perimeter of support assembly 218 in the preferred embodiment. One preferred embodiment has twelve notch pairs. FIG. 10 shows side 219a not including a passage 270 for illustration purposes for the regions between each of passages 270.

It is to be understood, that even though numerous characteristics and advantages of the invention have been set forth in the foregoing description, together with details of the structure and function of the invention, the disclosure is illustrative only, and changes may be made in detail, especially in matters as such shape, size, and arrangement of the parts within the principles of the invention to the full extent indicated by the broad general meaning of the terms which the appended claims are expressed.

What is claimed is:

1. A microwave corn popper device comprising:
   a bowl construction including:
      a closed bottom portion; and
      an inclined side extending upwardly from the bottom portion and terminating at a top portion, the bottom portion and the inclined side defining an enclosed bowl shape;
   a microwave susceptor disposed within the bowl construction adjacent the bottom portion to receive kernels of corn, the susceptor becoming hot in the presence of microwave energy; and
   a metal plate mounted to the bowl construction and disposed beneath the susceptor at a predetermined spaced apart distance, the metal plate including a portion disposed directly below the susceptor, the metal plate including a central planar portion, and an inclined outer peripheral portion disposed upwardly out of a plane defined by the central planar portion.

2. The popper device of claim 1, wherein the outer peripheral portion of the metal plate defines a frusto-conical shape.

3. The popper device of claim 1, wherein the bottom portion and the inclined side of the bowl construction comprise plastic.

4. The popper device of claim 1, wherein the microwave susceptor is separate from the bowl construction.

5. The popper device of claim 4, wherein the bowl construction includes a recess adjacent the bottom portion sized to receive the separate microwave susceptor, and wherein the bowl construction further includes a support rib, and a bottom inside surface, the support rib extending upwardly from the bottom inside surface and positioned to support the microwave susceptor at a spaced apart distance from the bottom inside surface.

6. The popper device of claim 5, wherein the microwave susceptor includes a dead zone adjacent the support rib.

7. The popper device of claim 4, further comprising a finger tab extending from the microwave susceptor.

8. The popper device of claim 4, wherein the microwave susceptor has a concave shape.

9. The popper device of claim 4, wherein the bowl construction includes a bottom inside surface and a support rib extending upwardly from the bottom inside surface, the support rib positioned to support the microwave susceptor at a spaced apart distance from the inside surface, the microwave susceptor having a concave shape with a central planar portion, the microwave susceptor having a dead zone adjacent to the support rib in the central planar portion.

10. The popper device of claim 1, wherein the microwave susceptor is positioned at a spaced apart distance from the central planar portion of the metal plate such that a layer of kernels supported by the microwave susceptor includes a portion which is at about 1.21 inches from the metal plate in a vertical direction.

11. The popper device of claim 1, wherein the bowl construction further comprises a support assembly including the metal plate for supporting the bottom portion of the bowl construction at a spaced apart distance from a horizontal surface, and wherein the bowl construction further comprises a twist-lock arrangement for selectively mounting the support assembly to the bottom portion of the bowl construction.

12. The popper device of claim 11, wherein the support assembly includes two mating halves, and a snap arrangement for snapping the mating halves to a locked position, the metal plate disposed between the two mating halves.

13. The popper device of claim 12, wherein each mating half includes a bump, each bump being oppositely disposed between the respective halves to each engage the metal plate.

14. The popper device of claim 11, wherein the twist-lock arrangement includes a stop to indicate the locked position.

15. A microwave corn popper device comprising:
   a bowl construction including:
      a closed bottom portion;
      an inclined side integral with the bottom portion and extending upwardly from the bottom portion and terminating at a top portion, the bottom portion and the inclined side defining an enclosed bowl shape; and
      a support assembly for supporting the bottom portion of the bowl construction at a spaced apart distance from a horizontal surface, the support assembly including two mating halves mounted to one another;
   a microwave susceptor disposed within the bowl construction adjacent the bottom portion to receive kernels of corn, the susceptor becoming hot in the presence of microwave energy; and
   a metal plate mounted to the support assembly and disposed beneath the susceptor at a predetermined spaced apart distance, the metal plate including a portion disposed directly below the susceptor, the metal plate disposed between the mating halves of the support assembly.

16. The popper device of claim 15, wherein the bottom portion, the inclined side, and the support assembly of the bowl construction comprise plastic.

17. The popper device of claim 16, wherein the microwave susceptor is separate from the bowl construction.

18. The popper device of claim 17, wherein the bowl construction includes a recess adjacent the bottom portion sized to receive the separate microwave susceptor, and wherein the bowl construction further includes a support rib, and a bottom inside surface, the support rib extending upwardly from the bottom inside surface and positioned to support the microwave susceptor at a spaced apart distance from the bottom inside surface.

19. The popper device of claim 18, wherein the microwave susceptor includes a dead zone adjacent the support rib.

20. The popper device of claim 15, wherein the support assembly includes a snap arrangement for snapping the mating halves together.

21. The popper device of claim 15, wherein each mating half includes a bump, each bump being oppositely disposed between the respective halves to each engage the metal plate.

22. The popper device of claim 15, further comprising a twist-lock arrangement for selectively mounting the support assembly to the bottom portion of the bowl construction.

23. The popper device of claim 22, wherein the twist-lock arrangement includes a stop to indicate the locked position.

24. A microwave corn popper device comprising:
an enclosed plastic bowl including:
a bottom portion, wherein the bottom portion of the bowl includes a recessed region with a bottom inside surface and a support rib extending upwardly from the bottom inside surface; and
an inclined side extending upwardly and outwardly away from the bottom portion and terminating at a top portion; and
a separate susceptor positioned in the bowl adjacent the bottom portion for receiving unpopped kernels of corn, the susceptor becoming hot in the presence of microwave energy, wherein the susceptor is positioned in the recessed region and separated from the bottom inside surface by the support rib.

25. The popper device of claim 24, wherein the susceptor includes a dead zone vertically above the support rib.

26. The popper device of claim 24, wherein the microwave susceptor has a concave shape.

27. The popper device of claim 24, further comprising a finger tab extending from the microwave susceptor.

28. A microwave corn popper device comprising:
an enclosed plastic bowl including:
a bottom portion, wherein the bottom portion of the bowl includes a bottom inside surface and a support rib extending upwardly from the bottom inside surface; and
an inclined side extending upwardly from the bottom portion and terminating at a top portion; and
a separate susceptor positioned in the bowl adjacent the bottom portion for receiving unpopped kernels of corn, the susceptor becoming hot in the presence of microwave energy, wherein a central portion of the susceptor is separated from the bottom inside surface by the support rib, and wherein the susceptor includes a dead zone vertically above the support rib.

29. The popper device of claim 28, wherein the microwave susceptor has a concave shape.

30. The popper device of claim 28, further comprising a finger tab extending from the microwave susceptor.

31. A microwave corn popper device comprising:
an enclosed bowl including:
a bottom portion, wherein the bottom portion includes a recessed region with a base and a side extending generally upwardly from an outer periphery of the base; and
an inclined side extending upwardly and outwardly away from the side of the recessed region of the bottom portion and terminating at a top portion; and
a separate susceptor positioned in the bowl adjacent the bottom portion for receiving unpopped kernels of corn, the susceptor becoming hot in the presence of microwave energy, wherein the susceptor includes a central portion and an outer peripheral edge, the susceptor positioned in the recessed region, wherein the outer peripheral edge of the susceptor is adjacent to the side of the recessed region, and the central portion of the susceptor is supported by a portion of the base of the recessed region.

32. The popper device of claim 31, wherein the base of the recessed region includes at least one support rib for spacing the central portion of the susceptor from a remainder of the base.

33. The popper device of claim 32, wherein the base of the recessed region includes at least two support ribs, a first rib centrally located, and a second spaced from and surrounding the first rib.

34. The popper device of claim 31, wherein the outer peripheral edge of the susceptor defines a generally arcuate portion defined by a radius relative to a central axis of the susceptor, and wherein the arcuate portion engages the side of the recessed region.

* * * * *